United States Patent
Harrington et al.

(10) Patent No.: US 10,792,999 B2
(45) Date of Patent: Oct. 6, 2020

(54) MULTI-CAPACITOR SENSOR ARRAY WITH INTEGRATED TEMPERATURE MEASUREMENT

(71) Applicants: Richard H. Harrington, Dexter, MI (US); Charles W. Krapf, Livonia, MI (US); Douglas William Briggs, Waukesha, WI (US); Frank Joseph Fedel, Royal Oak, MI (US)

(72) Inventors: Richard H. Harrington, Dexter, MI (US); Charles W. Krapf, Livonia, MI (US); Douglas William Briggs, Waukesha, WI (US); Frank Joseph Fedel, Royal Oak, MI (US)

( * ) Notice: Subject to any disclaimer, the term of this patent is extended or adjusted under 35 U.S.C. 154(b) by 0 days.

(21) Appl. No.: 15/861,988

(22) Filed: Jan. 4, 2018

(65) Prior Publication Data

US 2019/0277714 A1    Sep. 12, 2019

Related U.S. Application Data

(63) Continuation-in-part of application No. 15/254,620, filed on Sep. 1, 2016, now abandoned.

(51) Int. Cl.
  *B60K 15/04* (2006.01)
  *B60K 15/035* (2006.01)
  (Continued)

(52) U.S. Cl.
  CPC ............ *B60K 15/0406* (2013.01); *B22C 9/10* (2013.01); *B22D 17/08* (2013.01); *B22D 25/02* (2013.01);
  (Continued)

(58) Field of Classification Search
  CPC .............. B60K 15/0406; B60K 15/035; B60K 15/03504; B60K 15/077;
  (Continued)

(56) References Cited

U.S. PATENT DOCUMENTS 7,343,813 B1 *  3/2008  Harrington ............. G01L 1/146
                                                     73/780
7,861,605 B2 *  1/2011  Ogawa .................... G01L 5/164
                                                     73/862.69
(Continued)

*Primary Examiner* — Octavia Hollington
(74) *Attorney, Agent, or Firm* — Law Offices of John G. Posa

(57) ABSTRACT

A combined force- and temperature-sensing array includes an array of drive plates, an array of sense plates corresponding the drive plates, and a layer of dielectric material separating the drive and sense plates. A diode with a forward junction voltage is connected between at least one of the drive plates and at least one of the sense plates. A multiplexer is operative to select between an electrical pulse or an electrical current for delivery to the at least one drive plate. Circuitry is provided for sensing an applied force resulting from a change in capacitance between the at least one drive plate and the at least one sense plate when the electrical pulse is delivered, and for sensing a temperature resulting from a change in the forward junction voltage of the diode when the current is delivered. The sensor array may be provided as a shoe insert for diabetics with neuropathy.

21 Claims, 3 Drawing Sheets

(51) Int. Cl.
  *B22D 25/02* (2006.01)
  *B22D 17/08* (2006.01)
  *B22C 9/10* (2006.01)
  *G01K 7/01* (2006.01)
  *G01L 1/14* (2006.01)
  *B60K 15/077* (2006.01)
  *B60K 15/03* (2006.01)

(52) U.S. Cl.
  CPC ...... *B60K 15/035* (2013.01); *B60K 15/03504* (2013.01); *B60K 15/077* (2013.01); *G01K 7/01* (2013.01); *G01L 1/144* (2013.01); *G01L 1/146* (2013.01); *B60K 2015/03486* (2013.01); *B60K 2015/03493* (2013.01); *B60K 2015/03514* (2013.01); *B60K 2015/03538* (2013.01); *B60K 2015/03552* (2013.01); *B60K 2015/047* (2013.01); *B60K 2015/0438* (2013.01)

(58) Field of Classification Search
  CPC ........... B60K 2015/03486; B60K 2015/03493; B60K 2015/03514; B60K 2015/03538; B60K 2015/03552; B60K 2015/0438; B60K 2015/047; B22C 9/10; G01L 1/144; G01L 1/146
  USPC .......................................................... 73/780
  See application file for complete search history.

(56) References Cited

U.S. PATENT DOCUMENTS

| | | | |
|---|---|---|---|
| 9,250,143 B2* | 2/2016 | Harrington | G01L 1/142 |
| 10,271,787 B2* | 4/2019 | Harrington | A61B 5/4851 |
| 10,451,493 B2* | 10/2019 | Mathieu | G01L 1/142 |
| 2018/0032209 A1* | 2/2018 | Suzuki | G06F 3/0414 |
| 2018/0056778 A1* | 3/2018 | Hendler | B22D 17/08 |

* cited by examiner

MULTI-CAPACITOR SENSOR ARRAY WITH INTEGRATED TEMPERATURE MEASUREMENT

REFERENCE TO RELATED APPLICATIONS

This application is a continuation-in-part of U.S. application Ser. No. 15/254,628, filed Sep. 1, 2016, the entire content of which is incorporated herein by reference.

FIELD OF THE INVENTION

This invention relates generally to capacitive sensor arrays and, in particular, to a multi-capacitor sensor array with integrated temperature sensing.

BACKGROUND OF THE INVENTION

U.S. Pat. No. 7,343,813, the entire content of which is incorporated herein by reference, describes a capacitive sensor array comprising a first and second plurality of parallel conductors separated by a compressible insulator. The second plurality of conductors are paired to partially overlap the first plurality of conductors, in two-by-one sets, whereby a force applied in a plane parallel to the conductor array will cause capacitance between the first and second conductors to change. Serially sampling the two-by-one conductor sets for changes in capacitance provide information on both the magnitude and direction of the force. In addition, forces applied perpendicular to the planes causes the insulator to compress, thus also changing the capacitances of the two-by-one sets of the sensor array. The imbalance of voltages between the paired conductors is applied to amplifier to sense force magnitude and direction. An embedded computer implements different functions to calculate the forces and moments. Compression force appears as an increase in peak voltage magnitude in both of the paired conductors.

While the configuration just described enables the detection of lateral force in X, Y and compression along the Z axis, the layout does not facilitate the sensing of all six components of the various forces and moments. However, U.S. Pat. No. 9,250,143, the teachings of which are also incorporated herein by reference, describes in a multicapacitor sensor system facilitating the measurement of applied force and moments, including moments detectable in X, Y and Z, resulting in a full, 3-axis load cell with 6 degrees of freedom. To accomplish this, the electrodes of the sense plate pattern parallel to each of the orthogonal electrodes of the drive plate pattern may be formed with a plurality of segments enabling X, Y and Z forces and moments to be measured. In this case, at least eight electrodes of the sense plate pattern are parallel to the various orthogonal electrodes of the drive plate pattern, resulting in a total of at least 10 separate electrically conductive nodes in the sense plate pattern.

SUMMARY OF THE INVENTION

This invention modifies and improves upon large capacitive sensing arrays capable of measuring both axial and shear forces, including those described in U.S. Pat. Nos. 7,343,813 and 9,250,143, through the inclusion of integrated temperature measurement sensing. The preferred embodiments use silicon diodes as the temperature sensor, and they may be interleaved into the array in such a way that no extra signal traces are used.

This invention improves upon existing multi-capacitor sensing array by providing a combined force- and temperature-sensing array. The sensor includes an array of drive plates, an array of sense plates corresponding the drive plates, and a layer of dielectric material separating the drive plates and the sense plates. A diode with a forward junction voltage is connected between at least one of the drive plates and at least one of the sense plates. A multiplexer is operative to select between an electrical pulse or an electrical current for delivery to the at least one drive plate. Circuitry is provided for sensing an applied force resulting from a change in capacitance between the at least one drive plate and the at least one sense plate when the electrical pulse is delivered, and for sensing a temperature resulting from a change in the forward junction voltage of the diode when the current is delivered.

The at least one sense plate is coupled to an operational amplifier having inverting and non-inverting inputs and an output. A resistor and capacitor are connected in parallel between the inverting input and the output of the operational amplifier, such that the capacitor is operative to integrate the charge from the sense plate during a force measurement. The resistor serves two purposes; namely, to reset the integrator, and to function as a DC feedback gain resistor during a diode-based temperature measurement.

In the preferred embodiments, the diode is a silicon diode which may be a standard signal diode with a typical 0.6V forward bias voltage, or a Schottky diode with a typical forward bias voltage of 0.3V. The diode is forward-biased when sensing temperature but reverse-biased when sensing an applied force such that it virtually disappears from the Charge amplifier calculations. The diode when reversed biased appears only as a small fixed capacitance The array may include four sense plates directly underneath each drive plate to measure shear force, axial force, or both shear and axial forces. The Drive and Sense plates are attached to a compressible material such as but not limited to polyurethane A diode may be interconnected between each drive plate and at least one sense plate corresponding to that drive plate.

The sense plates are connected to analog-to-digital (A/D) converters to provide a digital measurement of force and temperature. The array may be divided into quadrants with electrical pulses being applied to a plurality of drive plates, each in a quadrant of the array. All quadrants of the array may then be read by a plurality of A/D convertors at the same time.

One use of the sensor array is for diabetics with neuropathy, which should help prevent foot ulcers by providing early warning signals to the diabetic. This allows the user to take the necessary action to prevent further inflammation of the area which can often lead to infections and subsequent amputations in many cases. In one specific implementation, the array takes the form of a shoe insert with very dense printed circuit board traces in both the array and a connector tab. In this case, a plurality of separate sensors are placed in the shoe array with multiple connections to each sensor. As a very specific example, an in-shoe sensor array may include 42 sensors with five connections to each sensor. Other sensor arrays may contain 100 or more sensors to more accurately measure shear forces, as well as increased spatial sensitivity to measuring temperature in many more locations that might be missed with fewer temperature sensors.

DETAILED DESCRIPTION OF THE PREFERRED EMBODIMENTS

This invention is incorporated into a capacitive sensor based upon an array of Drive Plates and Sense Plates, as described in U.S. Pat. Nos. 7,343,813 and 9,250,143. The Drive and Sense Plates are separated by a thin, compressible dielectric made of a rubber-like material. In Preferred embodiment there are four Sense Plates called X+, X−, Y+ and Y− directly opposite (underneath) each Drive Plate. Lateral movement of the Sense Plate(s) in relationship to the Drive plates indicates a shear force. If all 4 Sense Plate signals are equal, but of increased value compared to an unloaded condition, this indicates a pure axial force. If some of the 4 Sense Plate signals are un-equal, but of increased value, it indicates both a shear and axial force. The Drive and Sense Plates are preferably interdigitated to increase shear sensitivity without affecting operation in the axial mode. Moving the sense plates only a very small amount in relationship to the Drive plate will cause a significant change in capacitance as the capacitance is directly proportional to the overlap of the drive plate and sense plate segments. As the segments get smaller and smaller in width, the change in capacitance increases proportionally with applied shear forces. However if they are too small in width, the sensor will become non-monotonic. The capacitance will increase up to the point when the sensor elements are directly on top of one another, and then with more shear force, the capacitance will drop, entering a non-monotonic state. The array is highly multiplexed to keep the number of printed circuit board traces as well as the number of Charge Amplifiers and A/D converters inputs to a workable amount.

In accordance with this invention, temperature sensors are embedded in the capacitive force-sensing array, enabling a measurement and/or mapping of temperature, including temperatures changes over time, to be generated for various applications, including use as a diagnostic tool. One might think that the temperature measurements could be done with thermistors. However, in simulation and in practice, non-obvious parallel paths made this solution unworkable. In particular, it was discovered that thermistors allow for sneak current paths, leading to errors as the change of one thermistor change the others. The preferred solution uses conventional silicon diodes, either standard signal diodes, or Schottky diodes for the temperature measurements which, among other advantages, eliminates sneak current paths in the array.

Figure 3:
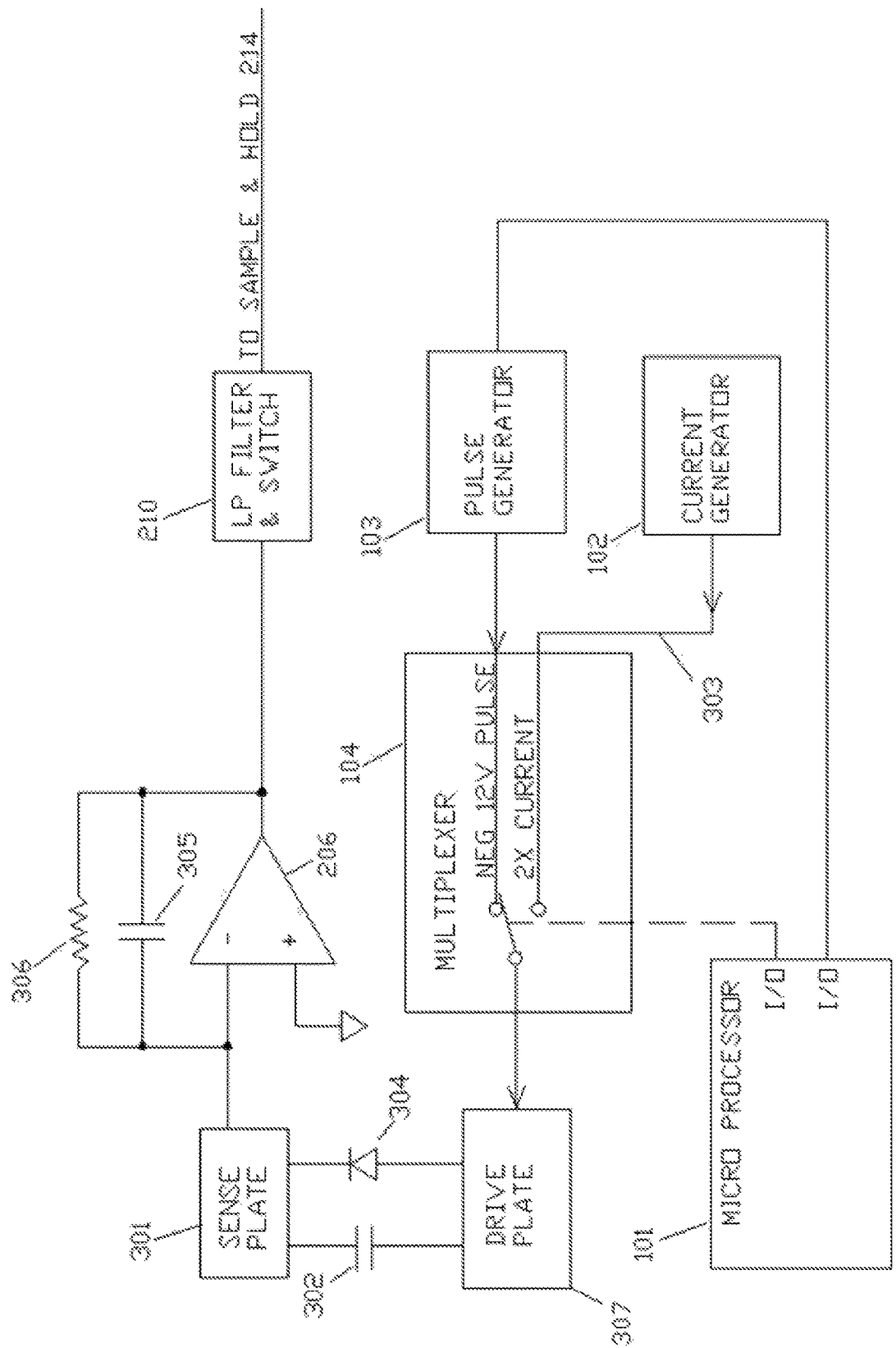
FIG. 3 is a block diagram depicting diode placement and temperature sensing.

As shown in FIG. 3, the diodes (i.e., 304), are placed between the drive plate and one of the sense plates at each of the sensors in the array. The diodes may be placed between each Drive Plate and its one of the Sense Plates, or a subset of the Drive Plates may be used. In the case of force sensing, a short negative-going pulse is applied to several Drive Plates, each in a quadrant of the sensor. All 4 quadrants of the sensor are read by 16 A/D convertors at the same time following signal processing. A point of novelty is the ability to measure both forces and temperature through the dual use of the same input amplifier. The charge amplifier is capable of measuring the very small capacitances of the sense plates, ~5 picofarads each or smaller values when the number of sensors is increased such as 1 pF or less, while also using this same amp to measure temperature.

Figure 1:
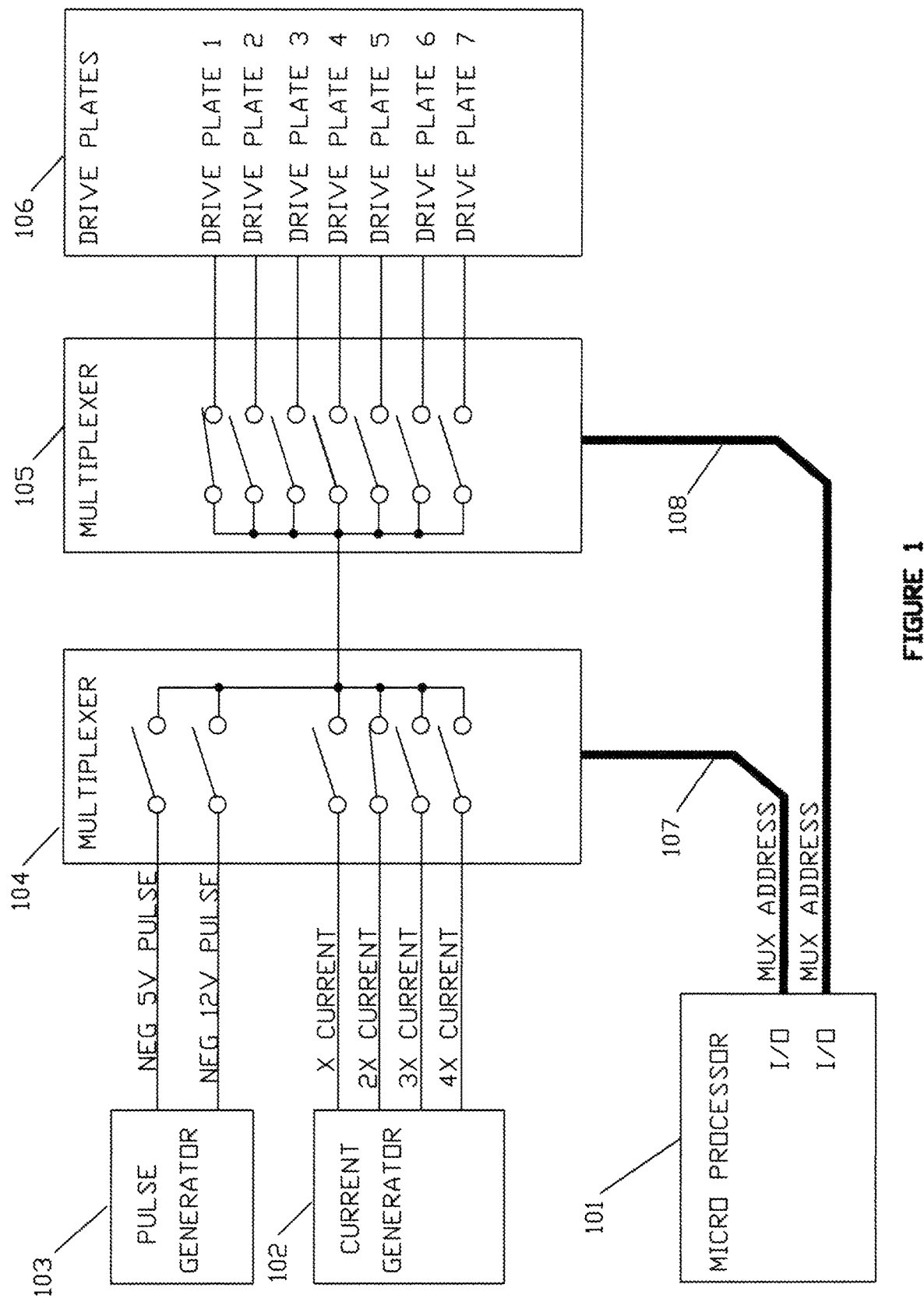
FIG. 1 is a simplified block diagram illustrating drive plate multiplexing.

Before describing the temperature measurement circuitry and functionality in detail, important aspects of the array in general will first be discussed. FIG. 1 is a block diagram that shows components associated with drive plate multiplexing. Pulse Generator 103 receives positive-going pulses from Micro Processor 101 using a crystal-controlled Pulse-Width Modulator (PWM) to provide a constant pulse width and period time. The Pulse Generator 103 has circuitry that produces negative-going pulses with fast rise and fall times, and with a low impedance to source the multiplexer 104 with both a negative 5V and a negative 12V pulses. As described in further detail herein, only one of the pulses will be selected at a time by the multiplexer (MUX) address lines 107 programmed by the Micro Processor 101.

Current Generator 102 provides quasi-constant current of 4 different current levels to the Multiplexer 104, and wherein the constant currents are all positive with respect to ground. The currents ultimately forward-bias diodes that have their cathodes at virtual ground. Only one of the quasi-constant current levels will be selected at any given time through MUX 104. That is, the MUX Address 107 can only select one of its 6 inputs at a time, so its output will be either one of two negative going pulses, or one of four quasi constant current levels. The term "quasi" is used because the currents are developed using resistors connected to a relatively high voltage compared to the dynamic voltage drop across the diodes 304 in FIG. 3. The Current generator may be made of true constant current sources such as well-known single or dual transistors, diodes and resistors. Because each temperature sensing diode has a slightly different forward voltage drop with a given current and temperature, a data base created various temperatures using will be used so that accurate temperatures can be computed. This is why the quasi constant current generators will work as well as a more accurate true constant current sources.

The output of the Multiplexer 104 is connected to the input of Multiplexer 105, the function of which is to provide the Drive Plates 106 with either the negative-going pulses from Pulse Generator 103, or one of the four quasi-constant current levels from Current Generator 102. Only one of the Drive Plates is active at one time in any one quadrant, and the MUX Address 108 defines which Drive Plate 106 is active. This is important for the matrix to work properly, as many of the Sense lines are connected together. If more than one Drive line were to be on at the same time, it would be impossible to know which sensor in the array is being addressed, and errors would occur.

Because there are four or more quadrant's (or sections), at least 4 Drive lines are active at any one time, this permits simultaneous sampling of four or more sensors at point in time.

Figure 2:
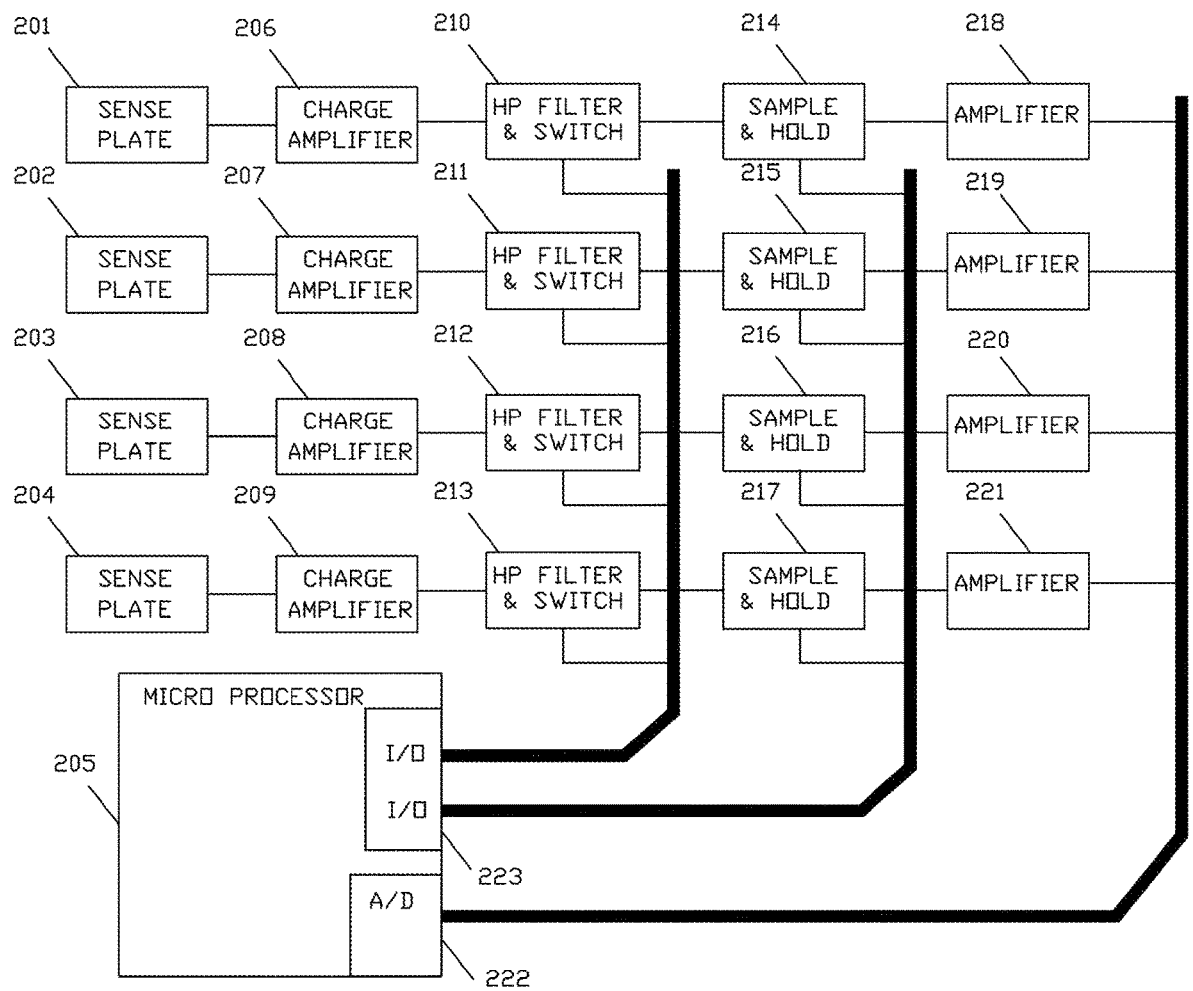
FIG. 2 is a simplified block diagram illustrating sense plate signal processing and amplification.

FIG. 2 is a drawing that shows sense plate signal processing. References 201, 202, 203, and 204 are the Sense Plates. These are formed under the Drive Plates on the flexible PC board made of a compliant material such as rubber, polyurethane, silicone, or similar material that will deform when forces are applied, either axial, or shear, or both simultaneously. Also it is desirable that the Drive and Sense Plates are interdigitated to provide high shear sensitivity.

Items 206, 207, 208, and 209 are the Charge Amplifiers that serve a dual purpose—one to function as a true charge amp, amplifying the charge coupled from its associated drive pate, and second to serve as an inverting amplifier, amplifying the DC current coming from the diodes 304 discussed with reference to FIG. 3. The Diodes are used as temperature sensors as they provide a linear forward voltage drop with temperature. As the diodes conduct in the forward mode, the currents at the Charge Amps 206, 207. 208 and 209 will change with temperature. It has been found that the forward voltage drop of the standard silicon diode is −2.5 mV per degree centigrade. The Schottky varies in the same direction at a different rate.

High-Pass Filters 210, 211, 212, and 213 are used for filtering the Charge Amplifier outputs when measuring forces. The primary function is to filter out line voltage (radiated voltage from power lines). Switches associated with the High Pass Filters (HP Filter) s are used to bypass the filter in the case of measuring the temperature via the diodes, as this is a DC current. Thus, the switches short out the series capacitor that is part of the filter.

Sample and Hold circuits (S/H) 214, 215, 216, and 217 process both the short pulse in the case of force sensing, and the DC voltage in the case of the temperature measurements. One common signal generated by the Micro Processor is the S/H pulse. When this signal goes high, a CMOS switch is closed and the output from the HP Filter and Switches 210, 211, 212, and 213 charges the S/H capacitor to a new value and it is held by the S/H capacitor when the S/H pulse goes low.

The outputs from S/H circuits 214, 215, 216, and 217 are connected to Amplifiers 218, 219, 220, and 221. These amplifiers will amplify both the forces from the sense plates as well as the temperature values. It has the same gain for both signals. Software will use a Calibration Matrix to create a transfer function from the raw voltage of the A/D convertor to actual forces and temperatures at each sensor.

In the case of measuring the small capacitance of the Sense Plates, a short, fast negative-going pulse is applied to the Drive Plates. This causes the sense plates to conduct a small current that is amplified by the charge amps. Referring now primarily to FIG. 3, the feedback path of the charge amp includes both a capacitor 305 to integrate the charge emanating from the Sense Plate, and a resistor 306 that serves a dual function—first to reset the integrator, and second to act as the DC feedback gain resistor in the case of the diode temperature measurement. In the case of force measurements, the charge amp output will go positive because the input current is negative, and is thus configured as an inverting amplifier. Depending on the size of the sense plates, varying Drive pulse widths may be generated. As the size gets smaller, the pulse width can be made shorter with a fast rise time that equates to a higher frequency. This will lower the Xc (capacitive Reactance) of the sense plate and allow for more electrons to flow into the charge amplifier. To make this practical, a high band width OpAmp will be necessary to respond to the high slew rate of the sense plate signal. Ideally, it will keep the summing junction of the charge amp at the same voltage as the non-inverting input.

Silicon diodes that are forward biased have a junction voltage that is temperature dependent. In our case, the anode of each diode is connected to the drive plate (one of 42 in one exemplary array). The drive plates are connected to multiplexers 104. While that can activate one drive line at a time, they are used to select either a negative fast and short pulse from generator 103 for force measurements, or a quasi-constant current from generator 102 for temperature measurement. When the quasi-constant current source is selected by the microprocessor 101 driving the address lines of the multiplexer, the small regulated positive current is applied to the anode of the diode(s). The cathodes of the diodes are connected to the inverting inputs of the operational amplifiers (OPAMPS) used as the charge amps and also inverting amplifiers in the case of temperature measurements.

As mentioned previously, the amps have both a resistor and a capacitor in the feedback loop; for the diode, the resistor is the dominate feedback path. The amp will go to slightly negative voltage in an inverse linear proportion to the diode temperature. The junction voltage of the diode decreases with an increase in temperature, so the amp output will go more negative as temperature rises because more current is applied to the inverting input of the amp.

The next stage of the input circuitry includes a high-pass filter 210 used to remove low frequency pick-up, primarily 50 or 60 Hz power line pick-up. This filter is a simple R-C network, but causes problems for the temperature measurement, which is DC. A CMOS switch is therefore used to short out the capacitor so that it will pass DC. In the case of the force measurements, the pulses used are typically 1 microsecond (1 uS) long or less for smaller Sense and Drive plates. This approximates an equivalent frequency of 500 KHz, if it were sinusoidal, however, because the edges of the 1 uS pulse are very fast, the equivalent frequency is much higher than 500 KHz. 100 nS or less pules may be used for smaller Sense and Drive plates.

The next stage of the input circuitry is a Sample and Hold (S/H) circuit used for sampling the Charge Amp output at the approximant middle of the drive pulse. This is the highest value of the Charge Amp output as the integrating capacitor slows down the Charge Amp output. For temperature measurement, the S/H switch is closed so the DC values are passed to the next stage.

The final stage in the signal conditioning area is a Non-Inverting Amplifier with a gain of approximately 30. This will amplify both the Charge Amp signals for force and the Temperature measurements. The outputs from this stage go to 16 A/D Convertors that will simultaneously measure all 16 Charge Amp or Temperature values. The Micro Processor will wirelessly send the values to a PC, or a smart phone for further processing such as min/max value alarms, trend analysis and other helpful algorithms.

Continuing the reference to FIG. 3, t sense forces, the PWM of 101 Micro Processor will generate a short pulse of 100 nS to 10 uS (typical) to the Pulse generator 103. (It will actually generate two different voltage level pulses, however, to simplify the block diagram, only the negative 12V is shown.) This pulse is connected to the Multiplexer 104 and is selected by an I/O pin located in the Microprocessor 101. This negative-going pulse is connected to a Drive Plate 307 by another multiplexer 105 shown in FIG. 1 but not shown for clarity of this Figure.

The Drive Plate 307 now has a negative charge that is coupled to the Sense Plate 301 through 'imaginary' capacitor 302. The actual capacitance is formed by the Drive plate and the Sense plate.

The Sense Plate 301 is connected to the Charge Amplifier 206, it is configured as an inverting amplifier with feedback elements 305, an integrating capacitor and 306, the resistor that will discharge the integrating capacitor, providing an integrator reset. The output of the Charge Amplifier 206 will go in the positive direction when the Drive Plate takes on a negative charge. The output is connected the High Pass filter 210 for filtering out the low frequencies such as line voltage, 50 or 60 Hz. The HP Filter output is connected to the Sample and Hold circuit 214.

For temperature measurements, one of 4 possible quasi-constant current levels is selected by Multiplexer 104 addressed by Microprocessor 101. The current selected emanates from a positive voltage source. This places a positive potential on the anode of diode 304, whose cathode is connected to the sense plate 301 which, in turn, is connected to the inverting input of the amplifier 206. Because this amplifier has a feedback resistor 306, the inverting input of the amplifier will be at virtual ground. This is due to the fact that the non-inverting input of the amp is tied to ground, and the amplifier is operating in its linear region.

Diode 304 is temperature sensitive, and its forward junction voltage will change with temperature. The relationship is an increase in temperature equals a decrease in junction voltage. This implies that with an increase in temperature, an increase in current at the Charge Amp 206 inverting input causes a more negative output voltage at the Charge Amp output. The capacitor 305 will not have any effect as the amplifier is working in the DC mode. The use of this Amp for both a Charge amplifier, and a standard Inverting Amplifier is unique. The Feedback resistor serves a dual purpose, one to reset the integrator in the Charge Amp scenario, and as a gain resistor in the Temperature sensing mode.

Because the diode 304 is back-biased when forces are being measured, a negative voltage is applied to the anode and the cathode is at a virtual ground, the Charge Amp case, no current flows from the anode to the cathode, and it does not interfere with the force measurements. And in the Temperature measurement case, the capacitance from the Drive plate to the Sense plate is ignored because it is measured in a DC mode, and capacitors are an open circuit in DC, thus resulting in no unwanted interaction.

Also unique to the invention is the fact that no extra printed circuit board traces are necessary to measure temperature, just placing the diode between the drive plate and one of the sense plates is all that is necessary. Rather, the PC board trace count is important in an array. For example, in an array of 50 sensors, running an additional 50 or 100 traces to connect to the diodes would make the connection to the electronics package very difficult. Multiple connectors would be needed, and the stray capacitance would affect the sensing circuits.

The invention claimed is:

1. A force- and temperature-sensing array, comprising:
an array of drive plates;
an array of sense plates corresponding the drive plates;
a layer of dielectric material separating the drive plates and the sense plates;
a diode with a forward or reverse junction voltage connected between at least one of the drive plates and at least one of the sense plates;
a multiplexer operative to select between an electrical pulse or an electrical current for delivery to the at least one drive plate; and
circuitry for sensing an applied force resulting from a change in capacitance between the at least one drive plate and the at least one sense plate when the electrical pulse is delivered, and for sensing a temperature resulting from a change in the forward junction voltage of the diode when the current is delivered.

2. The force- and temperature-sensing array of claim 1, wherein the at one sense plate is coupled to an operational amplifier having inverting and non-inverting inputs and an output;
a resistor and capacitor in parallel between the inverting input and the output of the operational amplifier
wherein the capacitor is operative to integrate the charge from the sense plate during a force measurement; and
wherein the resistor resets the integrator, and acts as a DC feedback gain resistor during a diode temperature measurement.

3. The force- and temperature-sensing array of claim 1, wherein the diode is a silicon signal or Schottky diode that is forward-biased when sensing temperature.

4. The force- and temperature-sensing array of claim 1, wherein the diode is reverse-biased when sensing an applied force.

5. The force- and temperature-sensing array of claim 1, including four sense plates directly opposite each drive plate to measure shear force, axial force, or both shear and axial forces.

6. The force- and temperature-sensing array of claim 1, wherein the multiplexer is controlled by a microprocessor.

7. The force- and temperature-sensing array of claim 1, wherein the sense plates are connected to analog-to-digital (A/D) converters to provide a digital measurement of force and temperature.

8. The force- and temperature-sensing array of claim 7, wherein:
the array is divided into quadrants; and
the electrical pulses are applied to a plurality of drive plates, each in a quadrant of the array; and
all quadrants of the array are read by a plurality of A/D convertors at the same time.

9. The force- and temperature-sensing array of claim 1, wherein the array is supported against a body part for medical diagnostics.

10. The force- and temperature-sensing array of claim 9, wherein the array forms part of a shoe insert.

11. The force- and temperature-sensing array of claim 1, including a diode interconnected between each drive plate and one corresponding sense plate.

12. A force- and temperature-sensing array, comprising:
an array of drive plates;
an array of sense plates including four sense plates corresponding to each one of the drive plates;
a layer of dielectric material separating the drive plates and the sense plates;
a diode with a forward junction voltage connected between each drive plate and at least one of the four sense plates corresponding to each drive plate;
a multiplexer operative to select between an electrical pulse or an electrical current for delivery to each drive plate; and
circuitry for sensing shear force, axial force, or both shear and axial forces resulting from a change in capacitance between each drive plate and the four corresponding sense plates when the electrical pulse is delivered to a drive plate, and for sensing a temperature resulting from a change in the forward junction voltage of the diode when the current is delivered to a drive plate.

13. The force- and temperature-sensing array of claim 12, wherein all four sense plates corresponding to each drive plate are coupled to a respective operational amplifier having inverting and non-inverting inputs and an output;
a resistor and capacitor in parallel between the inverting input and the output of the operational amplifier coupled to the drive plate including the diode connection;
wherein the capacitor is operative to integrate the charge from the sense plate during a force measurement; and
wherein the resistor resets the integrator, and acts as a DC feedback gain resistor during a diode temperature measurement.

14. The force- and temperature-sensing array of claim 12, wherein the diodes are silicon diodes that are forward-biased when sensing temperature.

15. The force- and temperature-sensing array of claim 12, wherein the diodes are reverse-biased when sensing applied force.

16. The force- and temperature-sensing array of claim 12, wherein the multiplexer is controller by a microprocessor.

17. The force- and temperature-sensing array of claim 12, wherein the sense plates are connected to analog-to-digital (A/D) converters to provide a digital measurement of force and temperature.

18. The force- and temperature-sensing array of claim 17, wherein:
   the array is divided into quadrants; and
   the electrical pulses are applied to a plurality of drive plates, each in a quadrant of the array; and
   all quadrants of the array are read by a plurality of A/D convertors at the same time.

19. The force- and temperature-sensing array of claim 12, wherein the array is supported against a body part for medical diagnostics.

20. The force- and temperature-sensing array of claim 19, wherein the array forms part of a shoe insert.

21. The force- and temperature-sensing array of claim 12, wherein the shear forces are calculated differentially using the equation $(X+)-(X-)=X$ Shear.

* * * * *